(12) United States Patent
Van De Logt et al.

(10) Patent No.: US 7,267,398 B2
(45) Date of Patent: Sep. 11, 2007

(54) GUIDING ASSEMBLY AND OPEN ROOF CONSTRUCTION PROVIDED THEREWITH

(75) Inventors: Frank Hendricus Gerardus Van De Logt, Bergen (NL); Marcel Johan Christiaan Nellen, Venray (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 11/341,811

(22) Filed: Jan. 27, 2006

(65) Prior Publication Data

US 2006/0170254 A1 Aug. 3, 2006

(30) Foreign Application Priority Data

Jan. 31, 2005 (EP) .................................. 05100607

(51) Int. Cl.
*B60J 7/057* (2006.01)
(52) U.S. Cl. ................................. 296/216.08
(58) Field of Classification Search .......... 296/216.08, 296/223, 220.01, 107.2
See application file for complete search history.

(56) References Cited

U.S. PATENT DOCUMENTS 2,869,923 A 1/1959 Mulichak 6,550,853 B2 * 4/2003 Wingen et al. ........ 296/216.03
2002/0034430 A1 3/2002 Sotiroff
2002/0089216 A1 7/2002 Wingen et al.
2004/0041434 A1 3/2004 Guillez

FOREIGN PATENT DOCUMENTS

DE 2234852 * 1/1974 ................. 296/223
DE 4107129 C1 6/1992

OTHER PUBLICATIONS

European Search Report in counterpart foreign application No. EP05100607 filed Jan. 31, 2005.

* cited by examiner

*Primary Examiner*—Dennis H. Pedder
(74) *Attorney, Agent, or Firm*—Steven M. Koehler; Westman, Champlin & Kelly P.A.

(57) ABSTRACT

A guiding assembly is provided comprising a guide channel with two opposite guide surfaces and a slide shoe positioned in the guide channel and cooperating with said two guide surfaces, wherein the guide channel comprises at least one curved section and wherein the slide shoe has an oblong shape. At least in the vicinity of its curved section the guiding assembly comprises an additional guide channel for cooperation with an additional slide shoe connected to the primary slide shoe.

20 Claims, 2 Drawing Sheets

GUIDING ASSEMBLY AND OPEN ROOF CONSTRUCTION PROVIDED THEREWITH

The discussion below is merely provided for general background information and is not intended to be used as an aid in determining the scope of the claimed subject matter.

Firstly the invention relates to a guiding assembly comprising a guide channel with two opposite guide surfaces and a slide shoe positioned in the guide channel and cooperating with said two guide surfaces, wherein the guide channel comprises at least one curved section and wherein the slide shoe has an oblong shape.

One example of such a guiding assembly can be found in an open roof construction for a vehicle, in which a closure mechanism for opening and closing a roof opening is provided with slide shoes positioned in a guide channel connected to a stationary roof part of the vehicle. Document DE-C-4107129 already shows an example of a slide shoe for application in such a guiding assembly. Generally, such slide shoes should be positioned in the guide channel in such a manner that a certain amount of friction is generated between said slide shoe and cooperating guide channel. For realising this, such a slide shoe often comprises an internal spring member which should have a certain extent for ensuring a proper operation. This is the reason, why such a slide shoe has an oblong shape.

When such a guiding assembly has to be applied, as stated above, in an open roof construction for example, the guide channel comprises at least one curved section in which it diverges from its otherwise longitudinal direction. Such a curved section is needed to provide the closure mechanism with a desired trajectory of movement.

The combination of guide channel comprising at least one curved section and a slide shoe having an oblong shape leads, however, to a disadvantage. Such a slide shoe basically comprises two long sides and two short sides (although generally being rounded). Positioned in a straight part of the guide channel said long sides will engage the opposite guide surfaces of the guide channel. The distance between the guide surfaces of the guide channel in such a straight section thereof basically will correspond with the distance between the opposed long sides of the slide shoe. When entering a curved section of the guide channel the points of contact between the slide shoe and guide channel will shift in a direction towards the short sides of the slide shoe, the amount of shift depending upon the inclination of the curved section of the guide channel. Positioned in such a curved section (where, as a consequence, the distance between the opposite guide surfaces of the guide channel is increased) the geometrical conditions are such, that already a small diversion of the position of the slide shoe from its optimal position will lead to undesired effects, such as for example jamming of the slide shoe in the guide channel or the creation of play between the guide channel guide surfaces and the slide shoe. Such effects should be prevented. However, preventing such effects is very difficult, because it would call for very small tolerances and an extremely stable positioning of the slide shoe.

SUMMARY OF INVENTION

This Summary and Abstract are provided to introduce some concepts in a simplified form that are further described below in the Detailed Description. This Summary and Abstract are not intended to identify key features or essential features of the claimed subject matter, nor are they intended to be used as an aid in determining the scope of the claimed subject matter. In addition, the description herein provided and the claimed subject matter should not be interpreted as being directed to addressing any of the short-comings discussed in the Background.

In accordance with an aspect of the present invention, a guiding assembly of the type referred to above is provided, wherein at least in the vicinity of its curved section, the guiding assembly comprises an additional guide channel for cooperation with an additional slide shoe connected to the primary slide shoe.

The provision of an additional guide channel in which an additional slide shoe is positioned helps eliminating the above-mentioned negative effects.

In an embodiment of the guiding assembly, the additional slide shoe has smaller dimensions than the primary slide shoe and, consequently, the additional guide channel is smaller in cross-section. Because, in this embodiment, the additional slide shoe has smaller dimensions than the primary slide shoe, the above explained negative effects will present itself in a far lesser extent with such an additional slide shoe then in relation to the primary slide shoe.

One shape of the additional slide shoe which proves to be very effective in eliminating the adverse effects referred to above, is a shape, in which the additional slide shoe has a substantially oblong cross-section with two opposite semi-circular ends.

In accordance with yet another embodiment of the guiding assembly, the curved section of the guide channel is positioned at one end of the guide channel. However, it also would be possible that the guide channel comprises more than one curved section. However, if this is the case, it is not necessary that an additional guide channel and an additional slide shoe is provided in the vicinity of each of those curved sections of the guide channel.

Another aspect of the invention secondly relates to an open roof construction or assembly for a vehicle, comprising a roof opening defined in a stationary roof part of the vehicle and a movable closure mechanism for opening and closing said roof opening, wherein said closure mechanism comprises slide shoes and said stationary roof part comprises guide channels, said slide shoes and guide channels defining guiding assemblies.

BRIEF DESCRIPTION OF THE DRAWINGS

Hereinafter the invention will be elucidated while referring to the drawing. Herein.

DETAILED DESCRIPTION OF THE ILLUSTRATIVE EMBODIMENTS

Figure 1:
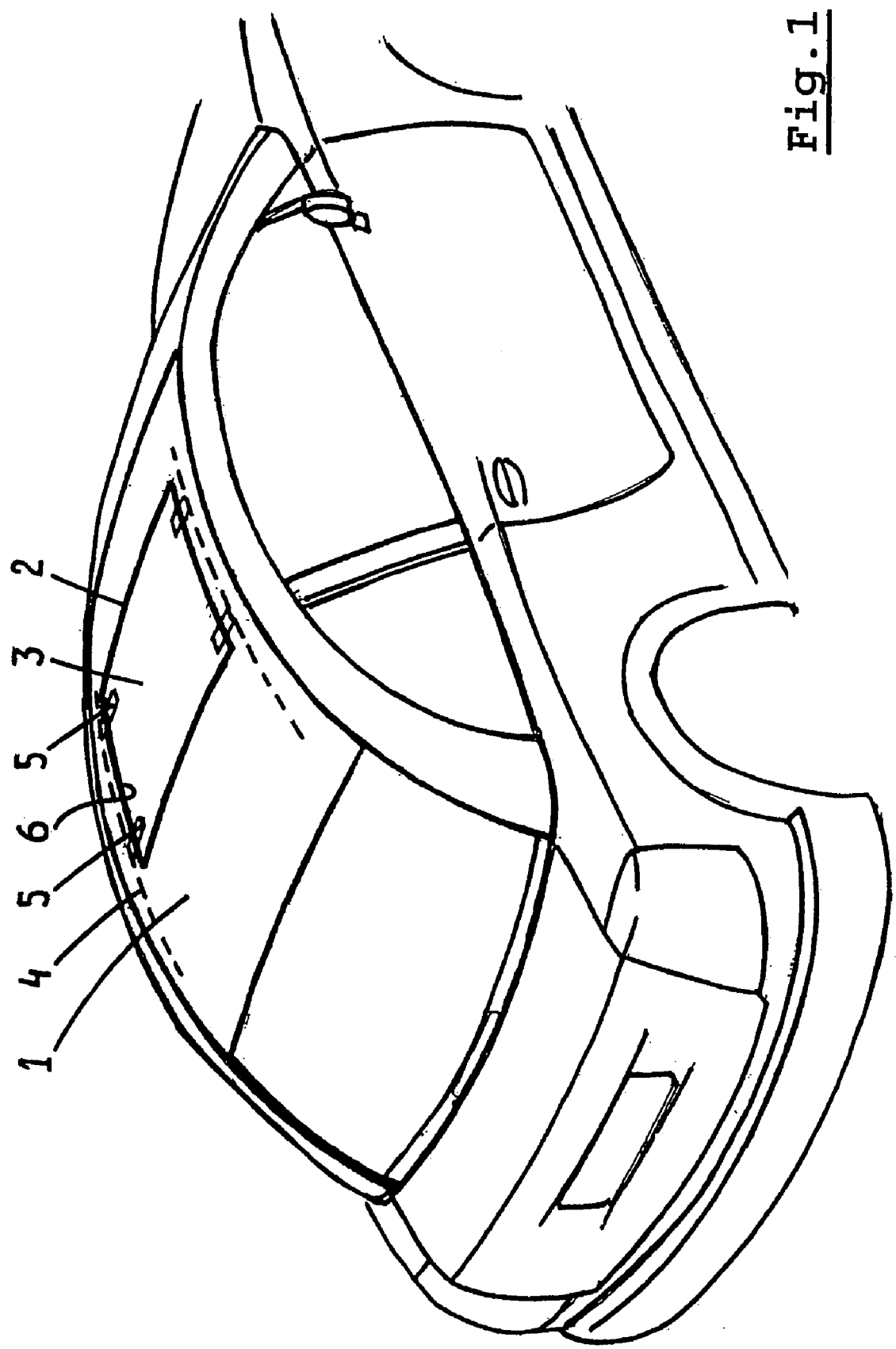
FIG. 1 shows, schematically and in a perspective view, a vehicle with an open roof construction, comprising a guiding assembly in accordance with aspects of the present invention.

FIG. 1 shows a vehicle having a stationary roof part 1 in which an open roof construction or assembly is provided in the vehicle roof having a roof opening 2 in the stationary roof 1. Said open roof construction includes a movable closure mechanism 3 for opening and closing said roof opening. The operation of the movable closure mechanism 3 may be manually or motor-driven, as is known per se.

For defining the trajectory of the movable closure mechanism 3 during its movement between a position for opening the roof opening 2 and a position for closing the roof opening, and vice versa, guiding assemblies are provided comprising guide channels 4 (indicated by broken lines) for cooperation with slide shoes 5 attached to longitudinal sides 6 of the closure mechanism 3, the guide channels being held in position along longitudinal sides of the roof opening 2.

As is know per se in the field of open roof constructions for vehicles, such guide channels 4 often comprise at least one curved section which is meant for providing the closure mechanism 3 with a relative vertical movement with respect to the stationary roof part 1, in addition to its relative horizontal movement for opening and closing the roof opening 2. Such a curved section of the guide channel 4 will connect to a basically straight section of the guide channel 4. When a slide shoe 5 is positioned in said straight section, the closure mechanism (or, more precise its part directly connected to such a slide shoe) will carry out a corresponding horizontal movement. However, when said slide shoe is in the curved section of the guide channel 4, it will provide the above-mentioned (additional) vertical movement of the closure mechanism.

Figure 2:
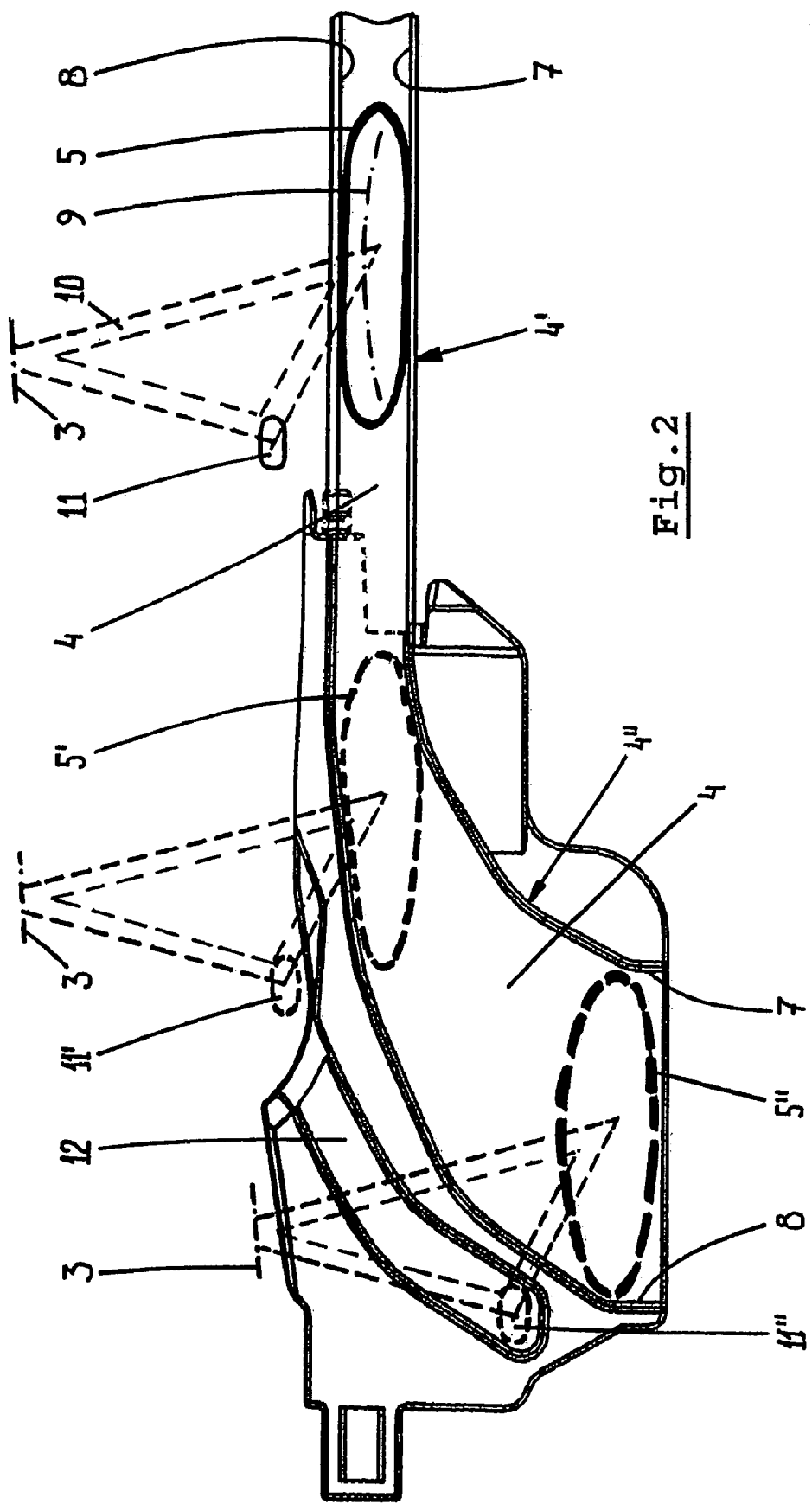
FIG. 2 shows, on an enlarged scale, and schematically, a detail of the guiding assembly.

Next, reference is made to FIG. 2, in which, on a larger scale and schematically, part of a guide channel 4 is illustrated. The right part of figure shows a straight section 4' of a guide channel 4. It comprises two opposite guide surfaces 7 and 8 which cooperate with a slide shoe 5 positioned in the guide channel. The slide shoe 5 has an oblong shape and is provided internally with a spring mechanism 9 (only indicated schematically) for maintaining the engagement between the slide shoe 5 and the guide surfaces 7 and 8 of the guide channel 4.

It is noted, that the guide channel 4 also could comprise additional guide surfaces, e.g. in parallel to the plane of the drawing.

A support mechanism 10 (again only indicated purely schematically) defines a connection between the slide shoe 5 and the closure mechanism 3.

Said support mechanism 10 further is connected to an additional slide shoe 11 which, as can be seen clearly in FIG. 2, has smaller dimensions then the primary slide shoe 5. As a result of the support mechanism 10 the additional slide shoe 11 always maintains a stationary relative position with respect to the primary slide shoe 5. The connection between the slide shoe 5 and additional slide shoe 11, therefore, may be direct or indirect.

In the left part of FIG. 2 a curved section 4" of the guide channel 4 is represented. When the slide shoe 5 enters this curved section 4" of the guide channel, it will assume positions such as 5' and 5" indicated in dotted lines. In position 5' the slide shoe has just started entering the curved section 4" of the guide channel and in its position 5" the slide shoe has reached an end position in the curved section 4" of the guide channel. Because in this end position 5" the slide shoe now engages the opposite guide surfaces 7 and 8 of the guide channel 4 with its left and right ends (rather than with its upper and lower sides as is the case in the straight section 4' of the guide channel) the internal spring mechanism 9 has expanded the slide shoe 5 towards its non-loaded shape.

In correspondence with the movement of the slide shoe towards its positions 5' and 5", the additional slide shoe 11 moves towards positions 11' and 11". In its end position 11" the additional slide shoe has reached an end position in an additional guide channel 12 extending alongside the curved section 4" of the guide channel 4. In its position 11', however, the additional slide shoe has not yet entered said additional guide channel 12.

The result of the provision of an additional guide channel 12 with cooperating additional slide shoe 11 is, that a more stable positioning of the primary slide shoe 5 in the curved section 4" of the guide channel 4 will be obtained, without disadvantageous effects such as jamming or a large play between the slide shoe 5 and the opposite guide surfaces 7 and 8 of the guide channel 4.

In the illustrated embodiment the additional slide shoe 11 has a substantially oblong cross-section with two semi-circular ends. It, however, is conceivable too that it has a different shape, such as for example circular.

Although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims.

The invention claimed is:

1. A guiding assembly comprising a guide channel with two opposite guide surfaces and a primary slide shoe positioned in the guide channel and cooperating with said two guide surfaces, wherein the guide channel comprises at least one curved section and wherein the primary slide shoe has an oblong shape, wherein at least in a vicinity of its curved section the guiding assembly comprises an additional guide channel for cooperation with an additional slide shoe fixedly coupled to the primary slide shoe.

2. The guiding assembly according to claim 1, wherein the additional slide shoe has smaller dimensions than the primary slide shoe and, consequently, the additional guide channel is smaller in cross-section.

3. The guiding assembly according to claim 2, wherein the additional slide shoe has a substantially oblong cross-section with two opposite semi-circular ends.

4. The guiding assembly according to claim 1, wherein the curved section of the guide channel is positioned at one end of the guide channel.

5. An assembly for a vehicle having a roof opening defined in a stationary roof part of the vehicle, the assembly comprising:
   a movable closure mechanism adapted to open and close said roof opening,
   a pair of guiding assemblies where a guiding assembly is disposed on each side of the closure mechanism, wherein each guiding assembly comprises a guide channel having two opposite guide surfaces and a primary slide shoe positioned in the guide channel and cooperating with said two guide surfaces, wherein the guide channel comprises at least one curved section and wherein the primary slide shoe has an oblong shape, wherein at least in the vicinity of its curved section each guiding assembly comprises an additional guide channel for cooperation with an additional slide shoe;
   a pair of supports, wherein each support is connected to the primary shoe and the additional slide shoe of each guiding assembly and to the closure mechanism, the supports being disposed on opposite sides of the closure mechanism to maintain a stationary relative position for the additional slide shoe and the primary slide shoe.

6. The assembly according to claim 5, wherein the additional slide shoe of each guiding assembly has smaller dimensions than the corresponding primary slide shoe and, consequently, the additional guide channel is smaller in cross-section.

7. The assembly according to claim 6, wherein the additional slide shoe of each guiding assembly has a substantially oblong cross-section with two opposite semi-circular ends.

8. The assembly according to claim 5, wherein the curved section of the guide channel of each guiding assembly is positioned at one end of the corresponding guide channel.

9. The guiding assembly of claim 1 wherein the additional guide channel is elevated from the guide channel and an end of the additional guide channel extends forwardly of an end of the guide channel.

10. The guiding assembly of claim 1 wherein the primary slide shoe is movable between a first position and a second position and the additional guide channel includes an inlet in a vicinity of the at least one curved section of the guide channel between the first and second positions.

11. The guiding assembly of claim 1 wherein the primary slide shoe includes a spring mechanism.

12. The guide assembly of claim 1 wherein the additional guide channel includes a curved section and the additional slide shoe is movable along the curved section of the additional guide channel in cooperation with movement of the primary slide shoe along the at least one curved section of the guide channel.

13. The guide assembly of claim 1 wherein the additional guide channel includes an inlet proximate to the at least one curved section of the guide channel.

14. The guide assembly of claim 13 wherein the additional guide channel includes a curved section proximate to the inlet to the additional guide channel.

15. The guiding assembly of claim 5 wherein the additional guide channel is elevated from the guide channel and an end of the additional guide channel extends forwardly of an end of the guide channel.

16. The guiding assembly of claim 5 wherein the primary shoe slide is movable between a first position and a second position and the additional guide channel includes an inlet in a vicinity of the at least one curved section of the guide channel between the first and second positions.

17. The guiding assembly of claim 5 wherein the primary slide shoe includes a spring mechanism.

18. The guide assembly of claim 5 wherein the additional guide channel includes a curved section and the additional slide shoe is movable along the curved section of the additional guide channel in cooperation with movement of the primary slide shoe along the at least one curved section of the guide channel.

19. The guide assembly of claim 5 wherein the additional guide channel includes an inlet proximate to the at least one curved section of the guide channel.

20. The guide assembly of claim 5 wherein the additional guide channel includes a curved section proximate to an inlet to the additional guide channel.

* * * * *